Oct. 4, 1966  T. A. INSOLIO  3,276,302
GLASS CUTTER
Filed April 15, 1963  9 Sheets-Sheet 2

INVENTOR.
Thomas A. Insolio
BY
Webb, Mackey & Burden
HIS ATTORNEYS

Oct. 4, 1966  T. A. INSOLIO  3,276,302
GLASS CUTTER

Filed April 15, 1963  9 Sheets-Sheet 3

INVENTOR.
Thomas A. Insolio
BY
Webb, Mackey & Burden
HIS ATTORNEYS

INVENTOR.
Thomas A. Insolio
BY
Webb, Mackey & Burden
HIS ATTORNEYS

Oct. 4, 1966

T. A. INSOLIO 3,276,302

GLASS CUTTER

Filed April 15, 1963

INVENTOR.
Thomas A. Insolio
BY
Webb, Mackey & Burden
HIS ATTORNEYS

Oct. 4, 1966 T. A. INSOLIO 3,276,302
GLASS CUTTER
Filed April 15, 1963 9 Sheets-Sheet 9

INVENTOR.
Thomas A. Insolio
BY
Webb, Mackey & Burden
HIS ATTORNEYS

United States Patent Office 3,276,302
Patented Oct. 4, 1966

3,276,302
GLASS CUTTER
Thomas A. Insolio, Jeannette, Pa., assignor to American-Saint Gobain Corporation, Kingsport, Tenn., a corporation of Delaware
Filed Apr. 15, 1963, Ser. No. 273,186
26 Claims. (Cl. 83—8)

This invention relates to improvements in glass cutting and relates in particular to a new glass cutter.

In modern methods of manufacturing and processing of sheet glass, stock sheets are indexed on a processing and conveying line whereupon such sheets are scored and broken along their score lines to obtain the desired size panes of glass. In large producing plants a very large number of different sized pieces are cut each day from a large variety of stock sheets. The planning, scheduling and processing of the large number of different sized pieces is a very complex operation.

A major economic factor encountered in the cutting of stock sheets is to obtain the best yield of usable pieces of glass from a given sized sheet and yet supply the desired pieces of glass. This requires decision making in the planning and scheduling phases to obtain the optimum use of the glass sheet. Such optimum use most often requires that a plurality of different sizes be cut from a given stock sheet. It is readily apparent that another limiting factor in the processing and cutting of glass sheets is the speed at which the stock sheets can be processed and cut into pieces of preselected sizes. This is especially true where frequent scheduled changes in the sizes are necessary. Manual hand cutting and handling of the glass sheets is a slow method and yet this method is still extensively employed in many major producing plants.

Glass cutting machines for scoring horizontally conveyed sheets of glass are generally composed of cutting heads which are mounted above the glass and are either driven across the glass surface, whereupon the cutting wheels are lowered into their cutting positions during their scoring cycle and are raised upon the return cycle, or such cutting heads are stationary and the glass sheets are conveyed under the cutting heads. Where such cutting heads are driven over the glass, they are generally suspended from an overhead bridge which is driven across the glass sheets.

The glass sheets or strips must, of course, be scored across their entire surface so that they may be broken evenly and squarely. In order to properly score the entire sheet, it is necessary that the cutting edge of the glass cutter be brought into contact with the edge of the glass sheet which is indexed on the cutting table. Consequently, it is necessary that the cutting wheels of the glass cutters be lowered prior to their contacting the edge of the sheet of glass.

One prerequisite with any system that depends on a high speed for its productivity is the proper timing of the various components in the system, i.e., the cutting component, the breaking component, the take-away conveyor and the distributing conveyor, so that the sheets or pieces produced therefrom travel or flow as a smooth stream through all components.

In my co-pending patent application "Method and Apparatus for Cutting, Transporting and Distributing Glass Sheets," Serial Number 235,932, filed November 7, 1962, now Patent No. 3,190,518, there is revealed a new and novel method and apparatus wherein primary and secondary processing and conveying lines index, score, break and convey sheets of glass. This method and apparatus is disposed to process sheets of glass as scored and broken tranversely to their direction of travel as contrasted to the conventional longitudinal scoring and breaking techniques. A new and novel glass cutting machine for cutting the sheets transversely is disclosed and described in my co-pending patent application entitled "Glass Cutting Machine," Serial No. 273,002, filed simultaneously with the present application, now Patent No. 3,183,747. In this machine a sheet of glass is automatically indexed on the cutting table of the machine and one or more, usually several, glass cutting or scoring heads are caused to bear on the surface of the sheet and are propelled across the sheet in a manner to effect transverse scores. To maintain a steady flow of cross-cut strips to the various processing lines, it is necessary that this cutting operation be completed as rapidly and efficiently as possible.

In rapidly operating cutting machines, such as that described in my aforementioned co-pending patent application, entitled "Glass Cutting Machine," such cutting edges strike the edge of the glass sheet with such force as to cause the glass to chip and break, which results in the scrapping of many sheets of glass. Also, such action greatly reduces the life of the glass cutting wheel or blade.

My invention is a glass cutter which consists of a pillar post or glass cutting wheel holder that is provided with downwardly depending wheels that are disposed to bear on and rotate on glass sheets that are to be scored. Means are provided for mounting the apparatus to the cutter bar of a glass cutting machine and means are provided for extending the pillar post downwardly so that the glass cutter is in a glass scoring position. The cutting edge (cutting wheel) of the pillar post is extended a predetermined distance below the surface contacting level of the downwardly depending wheels so that the glass sheets on which the wheels bear are scored.

In the preferred embodiment of my invention the pillar post is mounted on a frame and extends through a holder frame or carriage that is provided with wheels. The wheels are horizontally, rotatably mounted about the pillar post on the holder frame or carriage in parallel vertical planes. The cutting edge (cutting wheel) of the pillar post extends a predetermined distance below the surface contacting plane of the wheels so that when the wheels are brought to bear on a glass surface the cutting edge will score the glass. In my preferred embodiment there are also provided guide members that depend downwardly from the frame of the glass cutter that guide and support the carriage and pillar post.

By my arrangement, when the pillar post is lowered, the cutting wheel will be off the sheet and moving toward it, or the sheet will be moving toward the cutting wheel. The leading wheels of the carriage land on the sheet so that the cutting wheel or blade is appropriately elevated to substantially the vertical position such blade will have when scoring the sheet, and the cutting blade or wheel does not strike the edge of the glass sheet except at the proper glass scoring position. Also, if the carriage is lowered too soon and does not contact the sheet, it can move onto the sheet with no appreciable damage to the sheet or the blade.

Additionally, in my apparatus the glass cutting blade does not simply "fall off" of the edge of the sheet after the sheet has been scored, but is supported by the trailing wheels of the trolley or carriage until the cutting edge is well clear of the glass sheet.

Also, the glass cutter of my invention is mounted on the cutter bar in a manner that it may be accurately and automatically positioneed and may include a motor for remote positioning and a synchro-generator for feed-back position signal.

In the preferred embodiment of my glass cutter, a solenoid is mounted on a frame and when energized extends a pillar post holder and the pillar post downwardly so that the cutting wheel of the pillar post engages and scores relatively moving sheets of glass. As in the case of all solenoid operated glass cutters, the force and speed with which a solenoid extends its plunger effects an impact on the glass surface that is often injurious to the glass and/or the cutting wheel. In conjunction with my glass cutter, I have provided means for controlling such impact. My means consists of applying sufficient voltage to just cause the cutter to extend and then instantly applying full cutting voltage.

Although my control means is ideally suited for controlling my improved glass cutter, such means may be employed in conjunction with any solenoid operated glass cutter.

It is, accordingly, the object of the present invention to provide a glass cutter that may be adjustably mounted so as to contact and score a sheet of glass positioned thereunder upon relative motion of the surface of said glass to said glass cutter and that will not chip or break the edge of a glass sheet by contacting the edge of such sheet at a position below the position it will acquire during glass scoring.

It is also the object of the present invention to provide a glass cutter for an automatic glass cutting machine that can be regulated accurately as to the depth of cut or score it effects on a glass sheet.

A still further object of my invention is to provide a control system for solenoid operated glass cutters wherein the solenoids are caused to initially extend their plungers to convey the glass cutting means to the glass surface with less than full glass cutting force and then immediately apply full glass cutting force so as to reduce the initial impact on the surface of the glass.

Other objects and advantageous features of the present invention will be obvious from the following description and the drawings wherein.

Figures 1, 2:
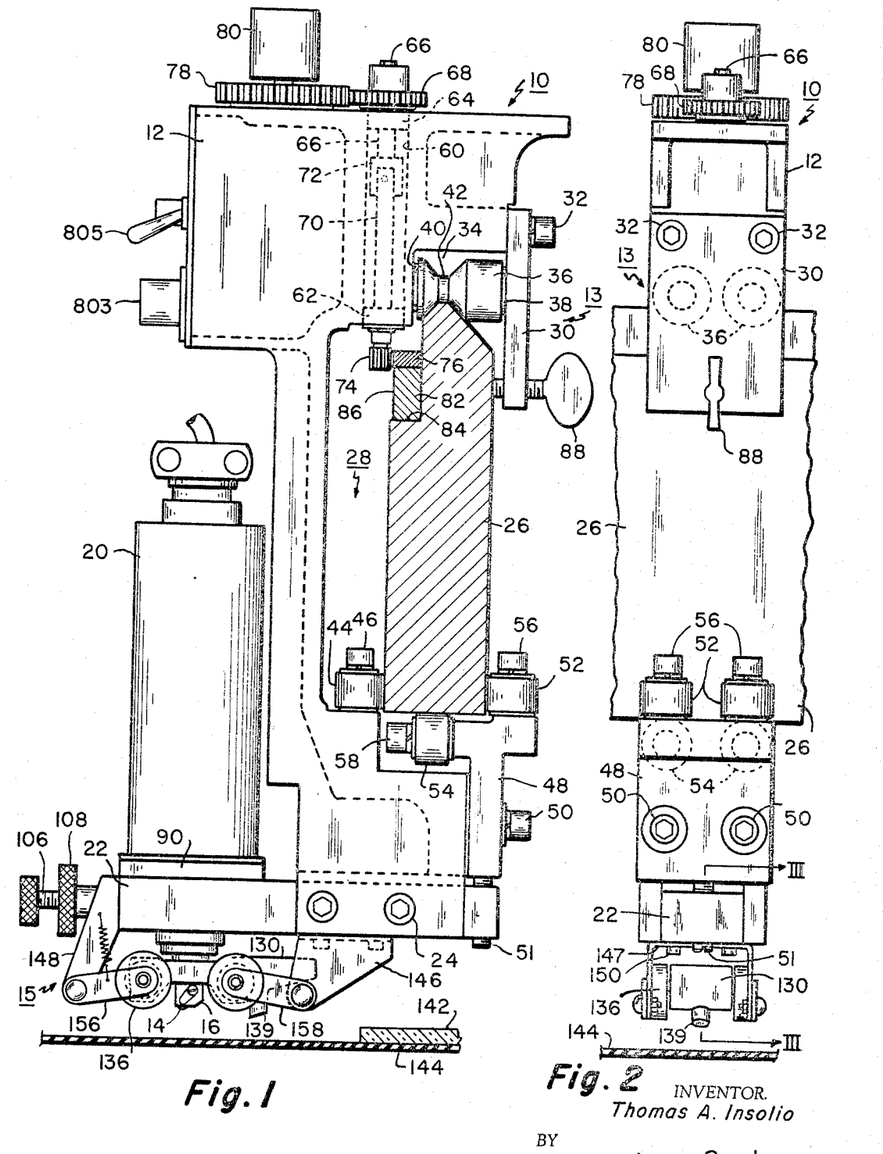
FIGURE 1 is a side elevation view of a glass cutter embodying the features of the present invention.
FIGURE 2 is a front elevation view of the glass cutter of FIGURE 1.

In FIGURE 1, there is shown a glass cutter 10 consisting of a frame 12, mounting means shown generally at 13 for mounting the glass cutter to the cutter bar 26 of a cutting machine (not shown) and glass cutting or scoring means shown generally at 15.

Figures 10, 11:
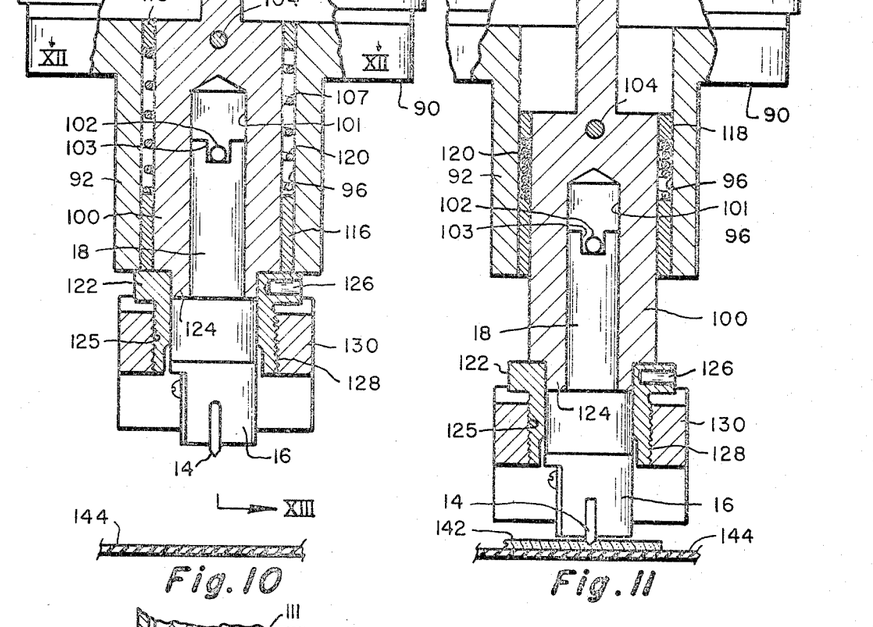
FIGURE 10 is an enlarged fragmentary sectional view of the apparatus of FIGURES 1 through 9 showing the cutting head and solenoid features.
FIGURE 11 is a view similar to that of FIGURE 10 with the cutting head extended into a glass engaging position.

Glass cutting or scoring means 15 consists of a glass cutting blade or wheel 14, which is rotatably mounted on the head 16 of a pillar post 18 (see FIGURES 10 and 11). Pillar post 18 and consequently head 16 and the blade 14, may be extended downwardly or retracted upwardly vertically by a solenoid 20. Solenoid 20 is mounted in a plate 22 that projects within the frame 12 and is attached thereto by means of bolts 24.

The glass cutter 10 is shown to be mounted on the cutting bar 26 of a cutting machine (not shown), that is conventionally either driven over the cutting table of a cutting machine so that the glass cutters (in the present instance, glass cutter 10) will score glass sheets or which will remain stationary while the glass sheets are conveyed beneath the glass cutters. As an example of the method of operation of a glass cutting machine employing a cutter bar such as bar 26, see my aforementioned Patent No. 3,183,747, entitled "Glass Cutting Machine."

Mounting means 13 consists of a series of rollers 36, 44, 52 and 54 mounted within a recessed area 28 formed within the frame 12, a downwardly depending support member 30, which is attached to the frame 12 by means of bolts 32, provides a recessed area 34 in which there are mounted rollers 36. Rollers 36 are rotatably mounted within the area 34 by means of bearings 38 and 40 appropriately positioned within depressions in the downwardly depending support member 30 and the frame 12. Rollers 36 are shown to be formed with a grooved area 42 which bear on the appropriately formed top section of the cutter bar 26. The recessed area 28 of the frame 12 has mounted therein cam rollers 44 that are appropriately bolted to the frame as at 46 and which are also rotatably mounted and which bear on the cutter bar 26. Attached to the lower portion of the frame 12 and extending upwardly is a support member 48. Member 48 is attached to the frame 12 by means of bolts such as shown at 50. There are rotatably mounted to the support member 48 two cam rollers 52 which bear on the outside surface of the cutter bar 26, and two cam rollers 54 which bear on the underneath portion of the cutter bar 26. The cam rollers 52 and 54 are appropriately attached to the member 48 by means of bolts 56 and 58. Hence, it may be seen that the glass cutter 10 is mounted on the cutter bar 26 so that it may be positioned along the length of the cutter bar.

Positioned within the upper end of the frame 12 is a vertical bore 60 shown in dotted outline in FIGURE 1. Rotatably mounted within the bore 60 is a drive shaft 66. Drive shaft 66 projects upwardly and is rigidly attached to a gear 68 and is also rigidly attached to a shaft 70 by means of a linking member 72 (details of which are not shown) Drive shafts 70 and 66 are rotatably mounted within the bore 60 of frame 12 by means of appropriate bearings 62 and 64. Rigidly attached to the shaft 70 and depending downwardly from the frame 12 within the area 28 is a gear 74 which bears on a toothed rack 76 that is attached to cutter bar 26. Hence, it may be seen that rotation of gear 68 will effect rotation of shafts 66 and 70 to cause the gear 74 to rotate in the toothed rack 76 to propel the glass cutter 10 along the cutter bar 26.

It will be appreciated that the gear 68 may be caused to rotate to position the glass cutter 10 along bar 26 in numerous ways. For example, such gear may be caused to rotate by means of drive chains or toothed racks projected across the top of the glass cutter 10. I have found it to be particularly convenient to provide a remotely controlled motor 80 (FIGURES 1 and 2) that is attached to frame 12 (not shown). The motor 80 is disposed to drive gear 78 which is meshed with gear 68. The remotely controlled motor 80 may be caused to rotate gear 78 in either direction so as to position the cutter 10 along the bar 26. The gear 68 may also be caused to mesh with a gear (not shown) that is disposed to drive a syncro generator (not shown) which generates a signal to the operator that the cutter is moving. Appropriate wires (not shown) to supply energy and control the motor 80 and to receive signals from an indicating device (such as a syncro generator) must be connected to the apparatus. Hence, it may be seen that by means of my apparatus, the cutter 10 may be easily and efficiently positioned along the cutter bar 26.

There is shown in the embodiment of FIGURE 1 a supporting bar 82 which fits in a grooved area 84 of the cutter bar 26 that supports the toothed rack 76. Bar 82 may be marked on its face 86 in feet and inches for convenience in positioning the glass cutter 10.

A butterfly bolt 88 shown to be threaded to downwardly depending supporting member 30 bears on the cutter bar 26. This bolt may be used to tightly secure and position the glass cutter 10 on the cutter bar 26 by hand if this be desired. Butterfly bolt or screw 88 will ordinarily be omitted where automatic or remotely controlled positioning of cutter 10 along cutter bar 26 is used.

The pillar post 18 is of conventional design and cutting wheel 14 is rotatably mounted in a slot (not shown) formed within head 16 on a horizontally positioned shaft positioned in an appropriate bore (not shown) which opens from the side of head 16 to bisect the slot. A retaining cover 17 attached to the side of head 16 by means of a screw 19 holds the shaft within its bore.

Figure 12:
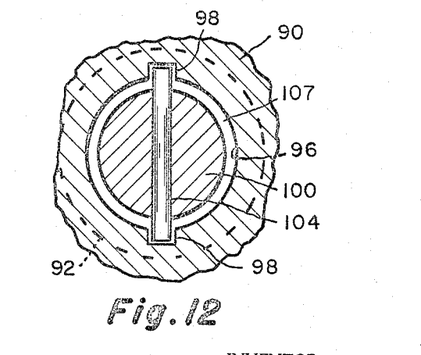
FIGURE 12 is a top section view of the apparatus of FIGURES 1 through 11, as seen from along the line XII—XII of FIGURE 10.

Solenoid 20 is seated on a flange 90 formed in the top of a cylindrical housing 92 (see FIGURE 10). Cylindrical housing 92 projects through an opening 94 (see FIGURE 3) formed within a plate 22. The housing 92 is provided with a central bore 96 (FIGURES 10–12) which is formed with opposing keyways 98 (see FIGURE 12). Positioned within the central bore 96 is a pillar post holder 100. Pillar post holder 100 is formed with a recessed area 101 into which the pillar post 18 is projected. Pillar post 18 is non-rotatably positioned with the recessed area 101 of holder 100 by means of a pin 102 projecting through a slot 103, formed in the top of pillar post 18, and into depressions (not shown) within the area 101 of pillar post holder 100. The pillar post holder 100 is slidably positioned within the housing 92 and is prevented from rotating within the housing 92 by means of a roll pin 104 projecting through an appropriate perforation within pillar post holder 100 and into the keyways 98 of housing 92 (see FIGURE 12).

The pillar post 18 is retained within the recession 101 of holder 100 by means of a set screw 105 (see FIGURE 13) projecting through a threaded perforation in the wall of holder 100. Hence, it may be seen that the pillar post 18 and pillar post holder 100 may be extended downwardly within the housing 92 or retracted upwardly and neither the holder 100 nor the pillar post 18 will materially rotate within the housing 92. The housing 92 is, in turn, prevented from rotation within the bore 94 of the plate 22 by means of a doghead set screw 106 (FIGURE 3) and retaining nut 108 which projects through an appropriate perforation in plate 22 into a depression 110 formed in housing 92 (see FIGURE 3).

Actuation of solenoid 20 will cause the pillar post holder 100 to project downwardly so that the cutter head 16 of the pillar post 18 and hence the cutter wheel 14 mounted within head 16 will be projected downwardly to contact and score a glass surface (see FIGURE 11).

Positioned within the bore 96 of the housing 92 between housing 92 and pillar post holder 100 is a bushing 116 that provides a bearing surface to pillar post holder 100 for its sliding relationship in regard to housing 92 and maintains a space 107 between housing 92 and holder 100. Also positioned near the top of pillar post holder 100 is a sealing ring 118. Sealing ring 118 is rigidly attached to the pillar post holder 100. Positioned between housing 92 and pillar post holder 100 within space 107 is a spring 120 which bears against ring 118 and bushing 116 and in so doing, tends to oppose downward pressure from solenoid 20 so that when solenoid 20 is activated, pillar post holder 100 is caused to extend downwardly in opposition to spring 120 as shown in FIGURE 11 and when the solenoid 20 is no longer activated, spring 120 expands to return pillar post holder 100 to the position as shown in FIGURE 10. Thus, it can be seen that actuation of solenoid 20 brings the cutting head 16, and particularly cutting wheel 14, into scoring position with the glass as shown in FIGURE 11, and that deactivation of the solenoid 20 permits the spring 120 to return the cutting assembly and cutting wheel 14 to an elevated position as shown in FIGURE 10.

A cylindrical shaped bushing 122 is positioned about pillar post 18 and a downwardly depending lip 124 of the pillar post holder 100. Bushing 122 is threaded on its outside circumference as shown at 128 and is threadably engaged with the central bore 125 of a frame or carriage member 130.

Frame or carriage member 130 is provided with transverse openings 132 (see FIGURES 5 and 6) which receive axle members 134. Wheels 136 are rotatably mounted to the axles 134 and are retained on the axles 134 by means of retaining rings 137. Wheels 136 are positioned about head 16 of the pillar post 18 so as to assume a horizontal surface contact level or plane represented by the line 138 in FIGURE 8. Level 138 is purposely spaced a predetermined distance above the level represented by the line 140 to which the cutter wheel 14 of the pillar post 18 projects. Such predetermined distance is the designed distance or desired distance to effect the proper depth of score. For example, in scoring sheets of window glass from about 1/8" to 1/4" gauge, it is desirable to effect a score depth from about .0015" to .0030". In this instance, the preset distance between the lines 138 and 140 or the level of the wheels 136 and the plane reached by the cutter disc 14 with the pillar post holder 100 in its extended position, is adjusted so that the space between such lines is from about .0015" to .0030". As may be seen, the distance between the lines 138 and 140 may be determined by adjustment of bushing 122. A spanner wrench (not shown) is appropriately inserted into holes 126 (of which there are five) of bushing 122, and the bushing 122 is caused to rotate within the threaded bore 125 of carriage 130 so as to determine the distance between the lines 138 and 140 and in doing so determine the depth of score since when pillar post holder 100 is extended in the manner shown in FIGURE 11, wheels 136 will bear on the glass 142 so that the cutter wheel 14 may extend into the glass only the distance that it projects below the plane of the contact surface of wheels 136.

Figure 7:
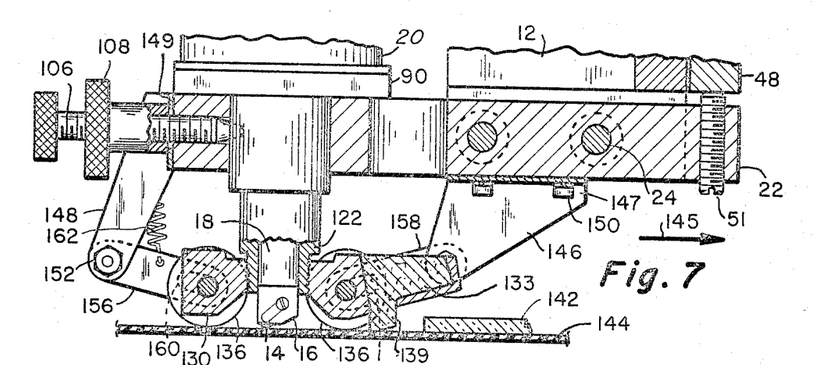
FIGURE 7 is an enlarged fragmentary elevation view partially in section which corresponds to FIGURE 3 with the glass cutter extended.
Figure 8:
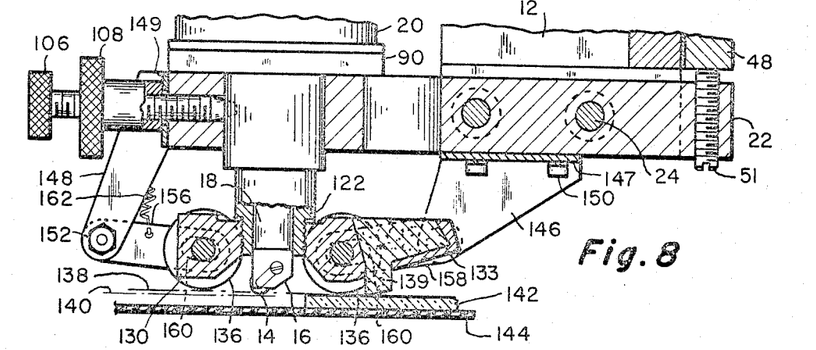
FIGURE 8 is a fragmentary view of the lower portion of the carriage and cutting apparatus of FIGURE 7, showing the apparatus contacting the edge of a sheet of glass.
Figure 9:
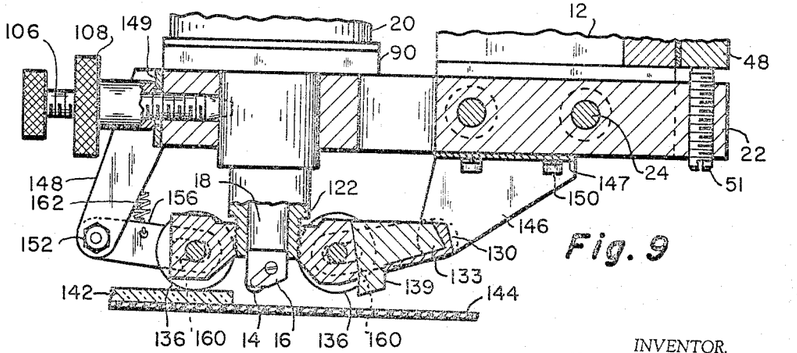
FIGURE 9 is a view, as in FIGURE 8, showing the positioning of the cutting portion of the apparatus of FIGURE 7 immediately after it has passed from contacting the edge of the glass sheet.

Obviously to effect a clean break across the entire width of the glass sheet, it is necessary that the score lines extend the entire distance from edge to edge of the glass sheet. If the score line does not travel entirely across, the glass sheet cannot be broken straight and even. Hence, the glass cutting or scoring edge of any glass cutter must be lowered to a position wherein it contacts the edge of the glass sheet. As set forth above, when a glass cutter is projected downwardly with the force required to score glass, it will naturally be at a low level when it strikes the edge of the glass sheet. However, in the present apparatus, such phenomena is avoided by the means of the wheels 136. Such feature is illustrated particularly in FIGURES 7, 8 and 9. In FIGURE 7, pillar post holder 100 is shown in its extended position so that the wheels 136 contact the conveyor belt 144 on the cutting table. The cutting apparatus 10 in this figure is being driven in the direction of arrow 145 and is disposed to score glass sheet 142 which is indexed on the cutting table. If the wheel 14 were to strike the edge of 142 in their position as shown by FIGURE 7, the edge of glass sheet 142 would be cracked or would chip and the cutting blade 14 will absorb an undue amount of shock. In FIGURE 8, however, it is shown that the leading wheels 136 have contracted and ridden up over the edge of the sheet 142. The trailing wheels 136 are also elevated since the pillar post holder 100 is vertically mounted within the housing 92. Wheels 136 contact the sheet 142 so that the cutting wheel 14 of the pillar post 18 scores sheet 142 to a depth equal to the predetermined distance between the lines 138 and 140. FIGURE 9 shows the cutting edge 14 of pillar post 18 after it is positioned beyond the trailing edge of the sheet 142. It may be observed that the cutting blade 14 has traveled beyond the edge of the sheet 142 so that it does not fall off of the edge 142 so as not to chip or break the trailing edge of the glass sheet.

In the preferred operation of my glass cutter, as will be demonstrated herebelow, the glass cutter will not extend to contact conveyor belt 144 in the manner shown by FIGURE 7, but the solenoid 20 will be activated so that the front wheels 136 will contact the glass sheet 142 in the manner shown by FIGURE 8 upon extension of the pillar post holder 100 and pillar post 18.

Since the wheels 136 of the carriage 130 contact the surface of glass sheet 142 and the wheels 136 bear on the surface of polished glass, it is preferable that they be constructed of a material that will not scratch or chip the glass 142. We have found plastic materials such as nylon to be quite acceptable for this purpose.

It is preferable that the cutting head 16 of pillar post 18 be rather loosely mounted so that some limited pivotal movement of the cutting wheel 14 may be effected. If such limited pivotal movement is not provided and the glass cutter 10 is slightly misaligned, it may be readily seen that the wheel 14 will wear excessively. Such limited pivotal movement is provided by the fact that the roll pin 104 fits loosely into the keyway 98 of housing 92 so that the pillar post holder 100 may pivot slightly within the bore 96.

Figures 5, 6:
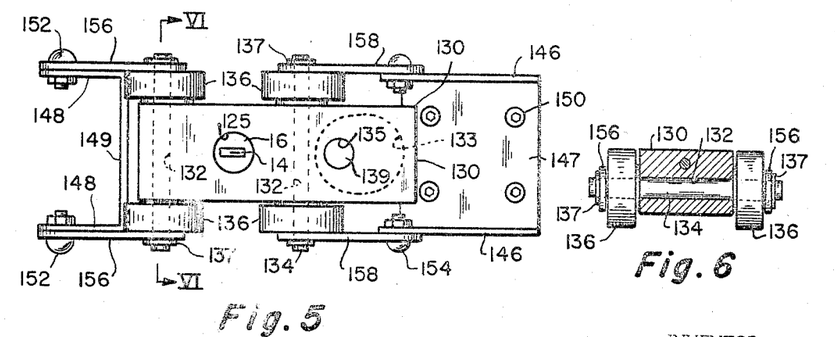
FIGURE 5 is a bottom plan view of the trolley portion of the apparatus of FIGURES 1 and 2.
FIGURE 6 is a cross-sectional view of the axle and wheel portion of the apparatus of FIGURES 1 through 5, as seen from along the line VI—VI of FIGURE 5.

It is preferable to provide additional support to the cutting head 16 of pillar post 18 to resist the force applied to pillar post 18 and pillar post holder 100 opposing the direction of travel represented by the arrow 145. Such additional support is provided to the carriage 130 by means of downwardly depending flanges 146 and 148 of brackets 147 and 149 (FIGURE 5). Bracket 147 is rigidly attached to plate 122 by means of bolts 150. Bracket 149 is held to plate 122 by means of similar bolts (not shown) and screw 106 and its retaining nut 108. Linking members 156 and 158 are pivotally mounted to flanges 146 and 148 of brackets 147 and 149 as shown at 152 and 154. Axle members 134 project through elongated slots 160 formed in linking members 156 and 158 and are held to axles 134 by appropriate retaining clips 137. Elongated slots 160 (see FIGURES 3 and 7) are necessary so that the pillar post holder 100 and pillar post 18 may be appropriately extended and retracted. While in the retracted position as shown by FIGURE 3 and extended position as shown by FIGURE 7, the axles 134 will be in an inward position within slots 160; however, while the holder 100 is being extended or during its retraction, the axles 134 will slide within slots 160 so that the links 156 and 158 will not rigidly hold the carriage 130 in a given position.

Spring members 162 mounted to links 156 and flanges 148 are cumulative with the action of spring 120 in effecting the return of the carriage 130 and, consequently, pillar post 18 and pillar post holder 100 to the position shown in FIGURE 10 when solenoid 20 is deactivated. Hence, it may be seen that the resistance force caused by propelling glass cutter 10 in the direction of the arrow 145 is resisted by the links 156 and 158 and brackets 147 and 149 as well as by bushing 122 and pillar post holder 100 so that the pillar post 18 is adequately supported within these members.

Figure 3:
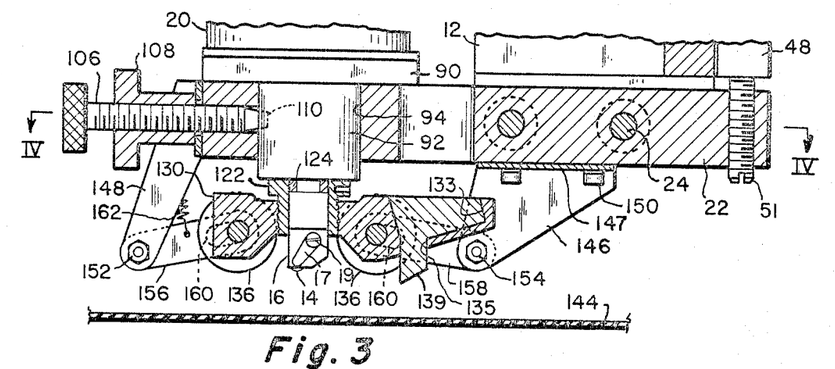
FIGURE 3 is an enlarged fragmentary sectional view of the lower portion of the apparatus of FIGURES 1 and 2, as seen along the line III—III of FIGURE 2.
Figure 4:
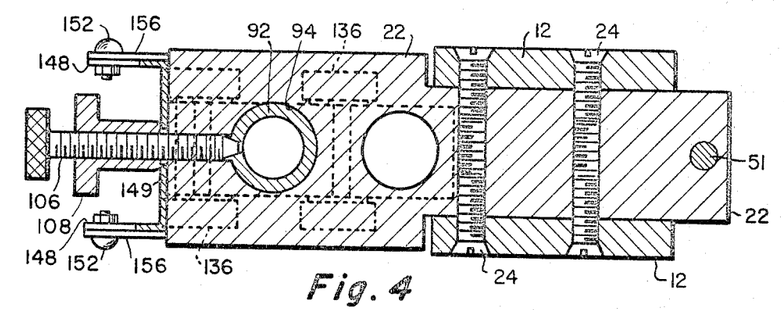
FIGURE 4 is a cross-sectional view of the apparatus of FIGURE 1, taken along the line IV—IV of FIGURE 3.

Carriage 130 is provided with a recessed area or reservoir 133 and a bottom opening 135 (see FIGURES 3, 4 and 5). A wick 139 composed of an absorbent material is positioned within the reservoir 133 and wick 139 projects through the opening 135 to act as a wiper in advance of the cutting wheel during scoring. A light oil, a mixture of oil and kerosene or other mixtures of petroleum products, is provided to the reservoir 133 and is absorbed by the wick 139. The wick conveys the fluid and applies it onto the sheet just prior to the cutting wheel. When a scored line in the glass is thus lubricated, a better break is achieved. A volatile mixture is used to insure dissipation after the break.

Figure 13:
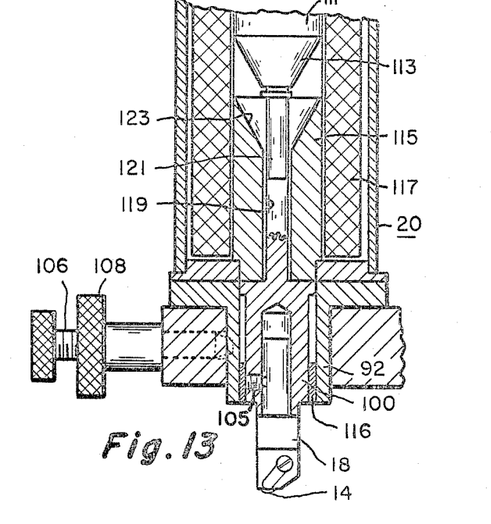
FIGURE 13 is a fragmentary sectional view of the embodiment of FIGURE 1 seen along the line XIII—XIII of FIGURE 10 showing the preferred tapered plunger (movable core) type of solenoid.
Figure 14:
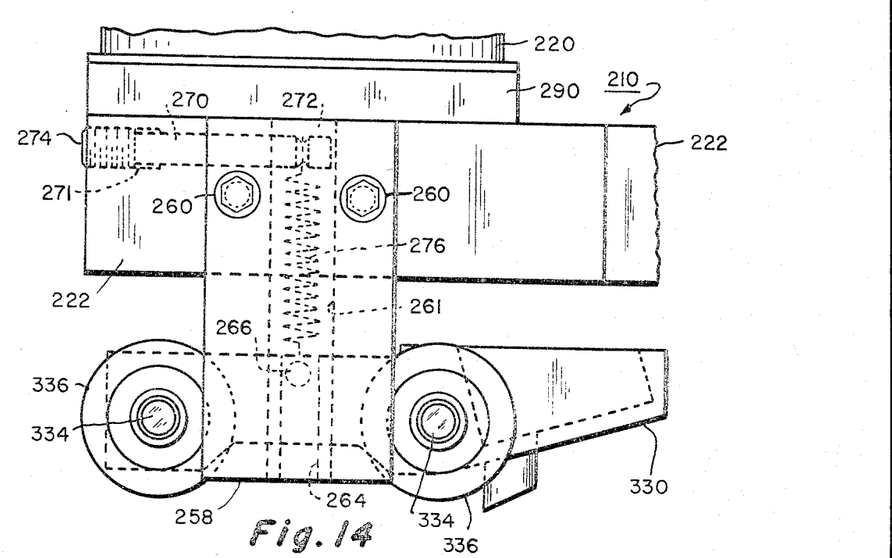
FIGURE 14 is a fragmentary elevation view showing the lower portion of a modified embodiment of the apparatus of the present invention.
Figure 15:
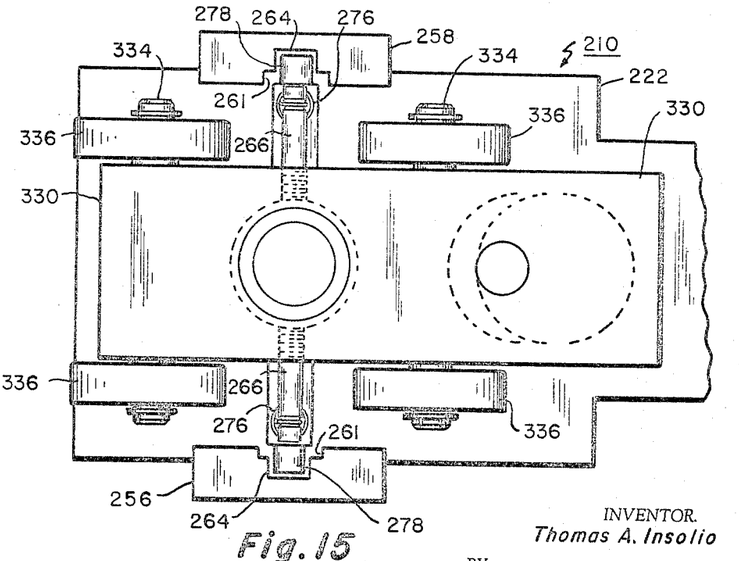
FIGURE 15 is a bottom plan view of the carriage of the apparatus of FIGURE 14.
Figure 16:
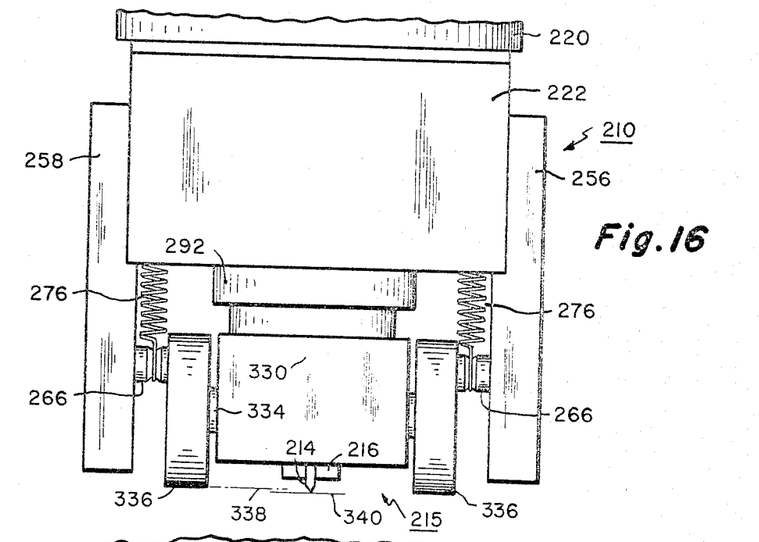
FIGURE 16 is a front fragmentary elevation view of the embodiment of FIGURE 14.

The solenoid 20 of the present apparatus may be any of the commercially available solenoids capable of extending a plunger downwardly so as to extend pillar post holder 100 and, consequently, wheel 14 downwardly, into a glass scoring position. I prefer to employ a solenoid with a tapered plunger (movable coil) such as is shown by the embodiment of FIGURE 13. In this embodiment the plunger or core 111 is provided with a tapered surface as shown at 113. A sleeve 115 is positioned within the coil 117 of solenoid 20. The sleeve 115 is provided with a central opening 119 through which a rod 121 projects. Rod 121 connects the pillar post holder 100 with the plunger 111 so that when the plunger 111 is extended downwardly, it will push pillar post holder 100 downwardly through sleeve 115. The sleeve 115 is formed with a conical opening as shown at 123, which opens to central opening 119 and which is disposed to received the tapered surface 113 of plunger 111 when it projects downwardly. As the plunger reaches its downward extended position, it is positioned within the conical opening 123. Such tapered plunger arrangement improves the force versus position relationship. The standard blunt ended type solenoid, at a constant voltage, develops a large variance of downward force as the position of the plunger changes. My tapered plunger minimizes such tendencies.

In FIGURES 14, 15, 16, 17 and 18, there is shown the bottom fragment of a glass cutter 210. The glass cutter 210 differs from glass cutter 10 essentially only in the members that link the carriage to the base plate and, consequently, the glass cutter 210 constitutes a modification of the apparatus of FIGURES 1 through 12.

The apparatus of FIGURES 14 through 18 consists of a frame (not shown) that is substantially identical to frame 12 of the embodiment of FIGURE 1. Mounted to such frame are cam wheels, such as wheels 52, 54 and 58, rollers 36, gear 68, shafts 66 and 70, etc., as provided to frame 12 of the embodiment of FIGURE 1 so that the glass cutter 210 may be mounted to a cutter bar such as cutter bar 26 of FIGURE 1 in an identical manner to glass cutter 10.

The glass cutting or scoring means 215 (FIGURES 16 and 17) consists of a glass cutting wheel 214, which is rotatably mounted on the head 216 of the pillar post 218. Pillar post 218, and consequently head 216 and blade 214 may be extended downwardly or retracted upwardly, vertically by a solenoid 220.

Figure 17:
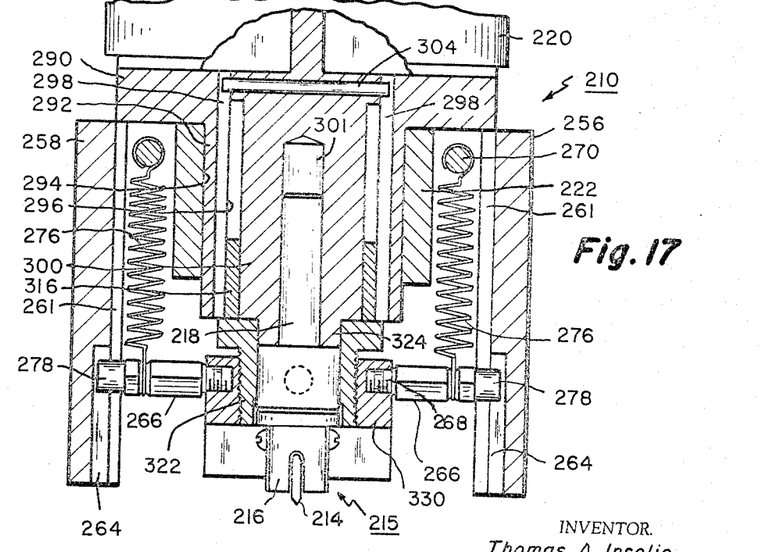
FIGURE 17 is a fragmentary sectional view of the embodiment of FIGURE 14 omitting the carriage member of FIGURE 15.
Figure 18:
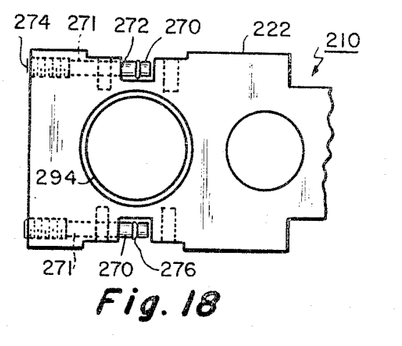
FIGURE 18 is a top plan view of the plate 222 of the embodiment of FIGURE 14.

A cylindrical housing 292 projects through an opening 294 (FIGURE 18) formed within a plate 222. The solenoid 220 is seated on the top flange 290 of housing 292. The housing 292 is provided with a central bore 296 (FIGURE 17) which is formed with opposing keyways 298 similar to keyways 98 of the apparatus of FIGURE 12. Positioned within the central bore 296 is the pillar post holder 300. Pillar post holder 300 is formed with a recessed area 301 into which the pillar post 218 is projected. Pillar post 218 is non-rotatably positioned within the recessed area 301 of holder 300 by means of a pin (not shown) projecting through a slot formed in the top of pillar post 218 and into depressions within the area 301 of the pillar post holder 300 in the manner pin 102 projects through slot 103 of the embodiment shown by FIGURE 10. As in the embodiment of FIGURE 10, the pillar post holder 300 of the apparatus shown in FIGURE 17 is slideably positioned within the housing 292 and is prevented from rotating within the housing 292 by means of a roll pin 304 projecting through an appropriate perforation within the pillar post holder 300 and into keyway 298 of housing 292. The pillar post 218 is retained within the recession 301 of holder 300 by means of a set screw (not shown) projecting through a threaded perforation in the wall of holder 300. Hence, pillar post 218 and post holder 300 may be extended downwardly or retracted upwardly within the housing 292 and neither the pillar post holder 300, nor the pillar post 218 will materially rotate within the housing 292. A dog head set screw (not shown) similar to screw 106, shown by the embodiment of FIGURE 3, and an appropriate retaining nut, prevent the rotation of housing 292 within the bore of plate 222. Actuation of solenoid 220 will cause the pillar post holder 300 to project downwardly so that the cutter head 216 of the pillar post 218, and hence, the cutter wheel 214 mounted within the head 216, will project downwardly to contact and score a sheet of glass.

A sleeve-shaped bushing 316 provides a bearing surface between the pillar post holder 300 and the housing 292. A spring similar to spring 120 of the embodiment of FIGURE 10 may be inserted into the area between the bushing 316 and pin 304, or may be omitted in the embodiment of FIGURE 17. The function of such spring would be the same as spring 120; however, it will be obvious in the following description that such function may be accomplished by other means.

A cylindrical shaped bushing 322 is positioned about pillar post 218 and a downwardly depending lip 324 of the pillar post holder 300. Bushing 322 is threaded and is threadably engaged with a carriage member 330. As in the case of the bushing 122 of the embodiments of FIGURES 1 through 13, bushing 322 is used to adjust the projection of the cutter wheel (214) relative to wheels 336.

Frame or carriage member 330 is provided with axle members 334 and wheels 336. Wheels 336 are rotatably mounted to the axles 334 and may be provided with appropriate bearings. Level 338 is properly spaced above level 340 to effect a predetermined depth of score.

It may be seen that up to this point the apparatus of FIGURES 14 through 18 is substantially identical to that of FIGURES 1 through 13. However, in lieu of such members as links 156 and 158, there are provided two guide members 256 and 258 that are rigidly attached to either side of the plate 222 by means of bolts 260 (FIGURE 14) which extend through suitable perforations in the guide members 256 and 258 and are threadably engaged with appropriate threaded recessed areas within the plate 222. The guide members 256 and 258 extend downwardly to either side of the carriage 330. The guide members 256 and 258 are formed with elongated grooves 261 (FIGURE 15) which extend the length of each member. The guide members 258 and 256 are additionally provided with further longitudinal guideways 264 formed within the lower portion thereof. A pair of spring studs 266 are attached to and extend outwardly from either side of the carriage 230 by means of their being threadably engaged with appropriate threaded recessions within the carriage 330 as shown at 268 (FIGURE 17). A pair of spring pins 270 project through appropriate perforations 271 formed within the plate 222, and extend into a recessed area 272 formed within plate 222 (see FIGURE 18) which mesh with the grooves 261. Pins 270 are maintained within their respective openings by means of socket set screws engaging appropriate threads within such openings as shown at 274 (see FIGURE 14). Opposing springs 276 are attached at their upper ends to spring pins 270 and at their lower ends to spring studs 266. Hence, it may be seen that springs 276 are connected to the plate 222 and to the carriage 330 so as to urge the carriage 330 along with bushing 322 and, consequently, pillar post 218 and pillar post holder 300 upwardly and away from the glass scoring engagement in opposition to solenoid 220.

It may be seen that the end portions 278 of spring studs 266 project into the guideways 264 (FIGURE 17) of the guide members 256 and 258 and, additionally, it should be noted that the grooves 261 of the guide members 256 and 258 and the recessed area 272 of plate 222, serve to provide space for positioning the springs 276.

From the above description, it will be appreciated that the glass cutting wheel 214 may be extended into its scoring position by activation of the solenoid 220 to extend the pillar post holder 300 and consequently the cutter wheel 214 in opposition to springs 276; however, when downward force applied by the plunger of solenoid 220 is discontinued, contraction of springs 276 will urge the pillar post holder 300 and, consequently pillar post 218 upwardly into a non-glass engaging position. A spring such as spring 120 of the embodiment of FIGURE 10 would be cumulative with springs 276 if employed. The carriage 330 is guided in its upward and downward travel by means of the ends 278 of spring studs 266 riding in the guideways 264 of guide members 256 and 258. Hence, the guide members 256 and 258 effectively and efficiently perform the function of the links 156 and 158 of the embodiment of FIGURES 1 through 12.

Figure 19:
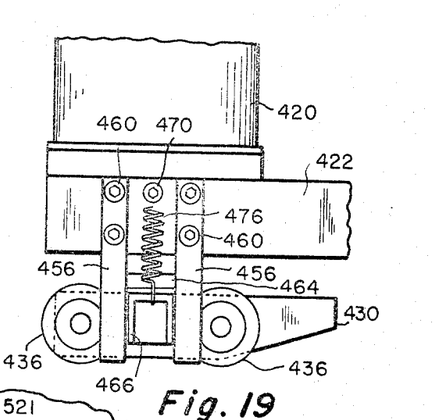
FIGURE 19 is a fragmentary elevation view showing the lower portion of still another modified embodiment of the apparatus of the present invention.

A still further embodiment and modification of the apparatus of the present invention is shown by FIGURE 19. In this embodiment a solenoid 420 is seated upon a plate 422 in the manner of the apparatus of FIGURES 1 through 13 and 14 through 17. The solenoid 420 is disposed to extend its plunger (not shown) in a manner to extend a pillar post holder and pillar post (not shown) downwardly in the manner of the previous embodiments and a carriage 430 provided with wheels 436 is attached to the pillar post holder (not shown) in the manner of the previous embodiments.

In the modification shown by FIGURE 19, a pair of elongated depending guide members 456, are bolted to the plate 422 as shown at 460. The guide members 456 extend down on either side of the carriage 430 in substantially parallel alignment, providing a space therebetween identified at 464. There is rigidly attached to either side of the carriage 430 and extending outwardly between the wheels 436 so as to substantially fill the gap 464 between the guide members 456, a bracket member 466. There is also rigidly attached to and extending outwardly from either side of plate 422, a spring pin 470. A vertically mounted spring 476 is attached to spring pin 470 at its upper end and bracket 466 at its lower end. The spring 476 is disposed to urge carriage 430 upwardly in opposition to the plunger of solenoid 420. Consequently, when the glass cutter of the embodiment of FIGURE 19 is extended or retracted, the carriage 430 is guided and maintained by the brackets 466 positioned between the guide members 456 in lieu of such guide members as guide members 256 and 258 of the embodiments of FIGURES 14 through 18 and links 1568 and 158 of the embodiments of FIGURES 1 through 13.

Figure 20:
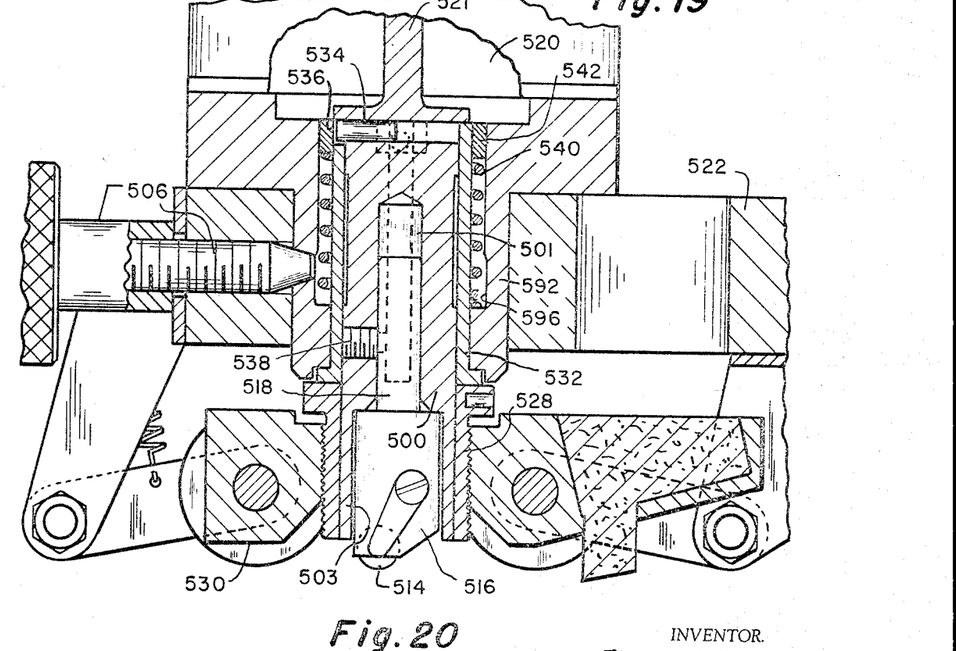
FIGURE 20 is a fragmentary sectional view showing the lower portion of a still further modified embodiment of the apparatus of the present invention, relating in particular to the pillar post holder.

Another modification of the apparatus of the present invention is shown by the embodiment of FIGURE 20. The embodiment of FIGURE 20 obviously may be employed in conjunction with any of the previously described apparatus since it does not involve the guide members and other modifications previously described. The apparatus of FIGURE 20 includes the solenoid 520, a housing 592, a plate 522, and a pillar post 518. Pillar post 518 is formed with a cutting head 516 to which there is rotatably mounted a glass cutting wheel 514. The pillar post holder 500 differs from the pillar post holders previously described in that it is provided with a central opening 501 that is formed with an expanded bore 503 near its lower end and that is disposed to receive the cutting head 516 of the pillar post 518. Additionally, pillar post holder 500 is elongated and extends through the bore of the bushing 528 and, consequently, extends through the carriage 530. A guide sleeve 532 is positioned about the pillar post holder 500 within the housing 592.

The pillar post holder 500 is non-rotatably attached to the sleeve 532 by means of pin 534 which extends through an appropriately positioned slot or perforation formed within the pillar post holder 500 and extends into appropriate perforations or grooves formed in the top of guide sleeve 532 as shown at 536. The pillar post 518 is non-rotatably secured to pillar post holder 500 by means of a doghead set screw as shown at 538. The housing 592 is secured against rotation by means of a set screw 506 corresponding to screw 106 of the embodiment of FIGURES 1 through 13. A spring 540 and a sealing ring 542 mounted within the central opening 596 of housing 592 perform the function of spring 120 and ring 118 of the embodiment of FIGURES 1 through 13 in urging the pillar post holder 500 upwardly in opposition to downward force applied by the solenoid 520 to cause the handle 521 to force the pillar post holder 500 and consequently the pillar post 518 downwardly so that the cutting wheel 514 is disposed to score glass.

It may be readily seen that the embodiment of FIGURE 20 provides a more rigidly mounted pillar post 518 since the bushing 528 does not bear on a mere lip of the pillar post holder 500, but the pillar post holder 500 extends entirely through the bore of bushing 528. Set screws (not shown) within the bushing 528 may be employed to attach the bushing 528 to the pillar post holder 500.

As decribed above, my apparatus is disposed to be mounted to the cutter bar 26 of an automatic cutting machine such as is described in my aforementioned patent entitled "Glass Cutting Machine." The apparatus of FIGURE 1 is mounted to the bar 26 and is disposed to be propelled along the bar by means of cam rollers 44, 54, 52 and roller 36, and may be propelled by means of the gear 68 through gear 74 that bears on the rack 76 in the manner previously described, and the glass cutter 10 may be secured to the cutter bar 26 against further rotation and positioning by means of butterfly screw 88. Such attachment means as screw 88 is not particularly satisfactory in that such screws may become loose due to vibration, require manual handling and does not lend itself to automatic equipment. In the embodiments shown by FIGURES 21 through 23, a braking means and retaining means for the apparatus of the present invention is shown and illustrated wherein all that is required to set such member is a 90° rotation of a cam post. Where means such as shown by the embodiments of FIGURES 21 through 23 are employed bolt or screw 88 will ordinarily be omitted.

Figure 21:
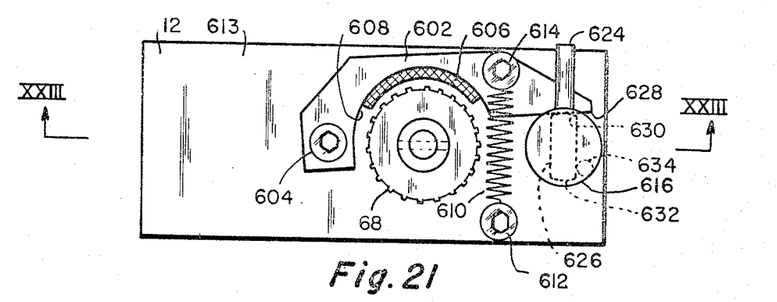
FIGURE 21 is a top plan view of a glass cutter similar to the embodiment of FIGURE 1, but being provided with braking means with the brake being shown in its "off" position.
Figure 22:
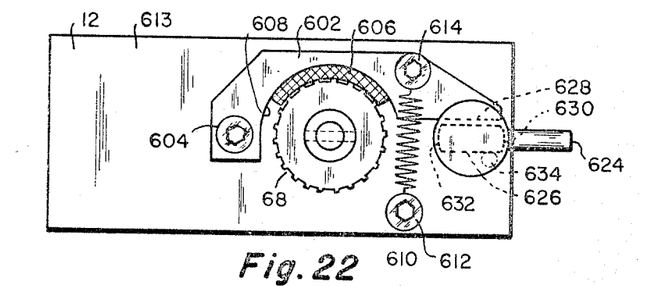
FIGURE 22 is a view such as FIGURE 21 showing the brake as "on" or applied.
Figure 23:
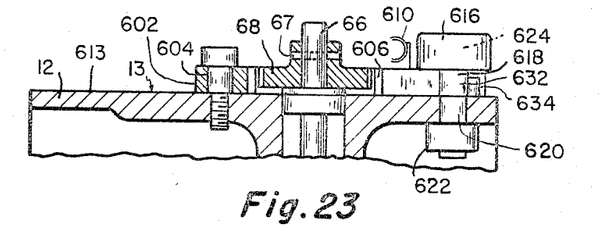
FIGURE 23 is a fragmentary sectional view of the embodiment of FIGURE 21 as seen along the line XXIII—XXIII of FIGURE 21.

In FIGURES 21 through 23, there is shown a top surface 613 of a housing 12 corresponding to housing 12 of glass cutter 10 of the embodiment shown in FIGURES 1 and 2. In the embodiment of FIGURES 21 through 23, a brake shoe 602 is shown to be pivotally mounted to the top surface 613 of housing 12 by means of a shoulder screw as shown at 604. Brake shoe 602 is provided with a rubber brake lining 606 attached to its semi-circular surface 608. A spring 610 is attached at one end to a shoulder screw 612 that is mounted to the top surface 613 of housing 12 and to a shoulder screw 614 mounted on the top surface of brake shoe 602. The spring 610 is disposed to urge the brake shoe 602 pivotally towards the gear member 68 which, as previously described, drives gear member 74 along a toothed rack 76 to propel the glass cutter 10 along the cutter bar 26. A cam post 616, framed with an elongated base 618 is rotatably mounted to the surface 613 of housing 12 by means of its shaft 620 projecting through a suitable perforation in the housing 12 and is secured to the housing 12 by means of a conventional retaining collar 622. The cam post 616 is also provided with an arm or roll pin 624 that extends outwardly. The elongated base 618 of cam post 616 is provided with parallel flat surfaces 626 (see FIGURE 22). The cam post 616 and its base 618 are positioned adjacent the forward surface 628 of the brake shoe 602 so that when the pin 624 is extended outwardly in the manner shown in FIGURE 22, the surfaces 626 are parallel with surfaces 628 of the brake shoe 602 and the spring 610 may urge the brake shoe 602 into engagement with the gear 68. When the pin 624 of cam post 616 is rotated 90°, the end portion 630 of the elongated base 618 bears on the surface 628 of brake shoe 602 to pivotally urge the brake shoe away from engagement of the brake lining 606 with the gear 68 in opposition to spring 610 (see in particular FIGURE 21). A stop member 634 rigidly attached to the surface 613 of the frame 12 bears on end portion 632 of the elongated base 618 to limit rotation of the cam 616.

Consequently, it may be seen that the cam post 616 will be positioned so that end 630 of the elongated base 618 of cam post 616 will be caused to bear on the surface 628 of the brake shoe 602 so as to space the lining 606 from the gear 68 when the glass cutter 10 is being positioned along the cutter bar 26. When the glass cutter has been appropriately positioned, it may be locked to the bar by rotating the cam post 90°. This may be accomplished by rotating pin 624 so that it points outwardly from the housing 12 in the manner shown in FIGURE 22. Rotation of cam post 616 provides a surface 626 of the elongated base 618 to be substantially parallel to the surface 628 of the brake shoe 602 so that the spring 610 will pivotally urge the brake shoe 602 towards the gear 68 so that the brake lining 606 will engage the gear 68 and prevent further rotation. When it is desired to again position the glass cutter 10, the pin 624 and cam post 616 are again rotated 90° to disengage brake shoe 602 from gear 68.

As shown by FIGURE 23, the gear 68 is secured to the shaft 66 by means of a roll pin 67. It is obvious that the roll pin 67 may be removed so as to remove or raise the gear 68 and insert a knurled brake drum in place of the gear 68. In this eventuality, a longer shaft 66 may be employed so that the gear 68 may be positioned above such drum. In any event, the means and apparatus described in FIGURES 21 through 23 provide an efficient and novel way of stopping the glass cutters as they are indexed along the cutter bar 26.

Figure 24:
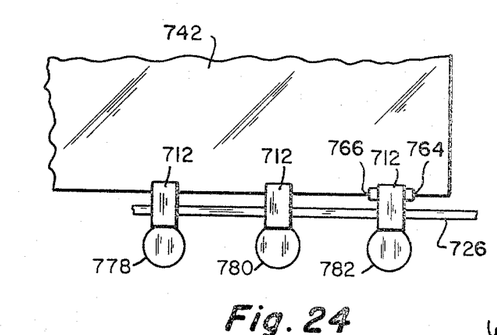
FIGURE 24 is an illustrative plan view of a number of the apparatus of FIGURES 1 through 10 shown adjoining a glass sheet preparatory to scoring.
Figure 25:
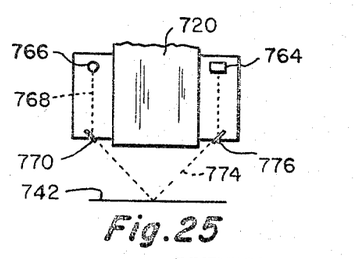
FIGURE 25 is an illustrative view of a light sensitive control apparatus embodied in conjunction with the glass cutters of FIGURE 1 through 10.

In FIGURES 24 and 25, there is shown a sensing system disposed to operate the glass cutters of the present invention.

It will be appreciated that the glass cutters 778, 780 and 782 of FIGURES 24 and 25 may be constructed in accordance with the embodiments of FIGURES 1 through 13, or the modified embodiments of FIGURES 14 through 23.

There is mounted to the housing 712 of glass cutter 782 a photoelectric cell 764 and a light source 766. The light source 766 directs its beam 768 to the surface of the cutting table by means of a mirror 770. The light beam 768 striking table 772 is not reflected unless glass appears thereunder. In the event a polished glass surface such as provided by glass sheets being scored in the manner set forth above appears under beam 768, the beam 768 will be reflected as shown at 774 and by means of a mirror 776 directed to the photoelectric cell 764. Such an eventuality may be arranged to activate a delayed action switch, disposed to activate the solenoid (identified at 720 in FIGURE 25, but may be solenoid 20 of FIGURE 1, 220 of FIGURE 14 or 420 of FIGURE 19) so as to lower the pillar post holder (100 in FIGURE 10 or 300 in FIGURE 17) and carriage (130 or 330) at the precise moment that the leading wheels (wheels 136 of FIGURE 1, 336 of FIGURE 14 and 436 of FIGURE 19) are positioned over the glass sheet 742 so that the leading wheels contact glass sheet 742 in the manner such as shown in FIGURE 8. In this eventuality, it can be seen that cutting wheel (14 of FIGURE 1, 214 of FIGURE 16) need not contact the cutting table, but is suspended above the cutting table and will only score the glass sheet 742. When the transverse score has been completed, the beam 774 will pass off the end of the sheet 742 so that the beam 774 is no longer reflected by the mirror 776 to photoelectric cell 764. The photoelectric cell 764 is consequently deactivated to operate a time delay switch calculated to deactivate the solenoid 720 at the precise instant that trailing wheels are in the position shown by FIGURE 9 so that the springs (such as springs 120 and 162) may effect a retraction of the pillar post holder (100 or 300) and carriage (130, 330 or 430) so that the glass cutter assumes the position shown in FIGURE 10 and the cutting wheel (14 or 214) is not permitted to contact the cutting table.

The embodiment shown by FIGURE 24 shows three of the glass cutters identified as 778, 780 and 782 which are mounted on the cutting bar 726 and one of which is provided with a photoelectric cell 764 and a light source 766 mounted as shown by FIGURE 25. It may be readily seen that the glass cutters 778, 780 and 782 may be appropriately positioned, i.e., by the rotation of a gear 78 (see FIGURES 1 and 2) to effect rotation of the gear 68 to position the glass cutters along the index marks on the face 86 of bar 82 that is mounted on cutter bar 26 (726 in FIGURE 24) so that they may effect predetermined score marks on the glass sheet 742 when the cutter bar 726 is driven across the sheet 742 by the glass cutter machine, or where the sheet 742 is driven under the bar 726 and the cutters 778, 780 and 782 during the cutting operation.

As the photoelectric cell 764 of the glass cutter 782 detects the edge of sheet 742, time delay switches cause the solenoids of each of these glass cutters (778, 780 and 782) to extend the pillar post holders (100 or 300) in opposition to springs (120 and 162 or springs 276 of FIGURE 17, 476 of FIGURE 19) so that the leading wheels (136, 336 or 436) of each of the glass cutters contact the edge of the glass 742 in the manner shown in FIGURE 8. The cutting wheels of each of the glass cutters 778, 780 and 782 then score the sheet 742 and when photoelectric cell 764 no longer detects the beam 774, a time delay switch deactivates the solenoids 720 of each of the glass cutters 778, 780 and 782 so that the opposing springs cause the pillar post holders (100 or 300) and carriages (130, 330 or 430) to be retracted in the manner shown by FIGURE 10 at approximately the moment the cutting wheels (14 or 214) are in the position shown by FIGURE 9. Hence, it may be seen that by the apparatus of the present invention, the glass cutter may be positioned on the cutting bar of the glass cutting machine and may be caused to be drawn across a glass sheet so as to score the sheet to the precise predetermined depth and such cutters may be retracted so as to avoid contact of the cutting wheel with the surface of the cutting table or the conveyor belt. It also may be seen that should the cutting wheel be prematurely lowered, it will not chip or break the edge of the indexed glass sheets.

The time delay effected between the time photoelectric cell 764 detects the edge of glass sheet 742 and the solenoid 720 is caused to lower the pillar post so that the cutting wheels are caused to score the glass is disposed to be adjustable. Such time delay adjustment means allows the operator to adjust the sequence so that when the solenoids 720 of glass cutters 778 to 782 extend their pillar post holders so as to lower the carriage (133 or 430), the forward wheels of the carriage may be caused to bear on the edge of the glass sheet 742 in the manner the wheels 136 bear on sheet 142 as shown by FIGURE 8. If the wheels fall short of the glass sheet 742, the time delay may be lengthened and if the glass cutting wheel prematurely contacts the edge of the sheet 742, the adjustable time delay may be adjusted so as to shorten the time between detection and extension.

A major problem with a solenoid operated glass cutter employed in automatic cutting machines such as that described in my aforementioned patent is the force and speed with which such solenoids extend the pillar post and cutting wheel to contact the glass sheets.

The resulting impact of the carriage wheels (such as wheels 136 of FIGURE 1) may be injurious to the glass. Additionally, if the cutting wheel (such as wheel 14 of FIGURE 1) contacts the glass prematurely while the solenoid is extending the pillar post holder, the resulting impact may be injurious to the wheel or the glass or both. Additionally, it will be appreciated that the control system of FIGURE 26 may be employed in conjunction with solenoid operated glass cutters other than those of the present invention in which event the cutting wheel may be extended so as to immediately contact the edge of the glass sheet and the cutting wheel may be damaged by the sudden downward force applied by the solenoids.

Figure 26:
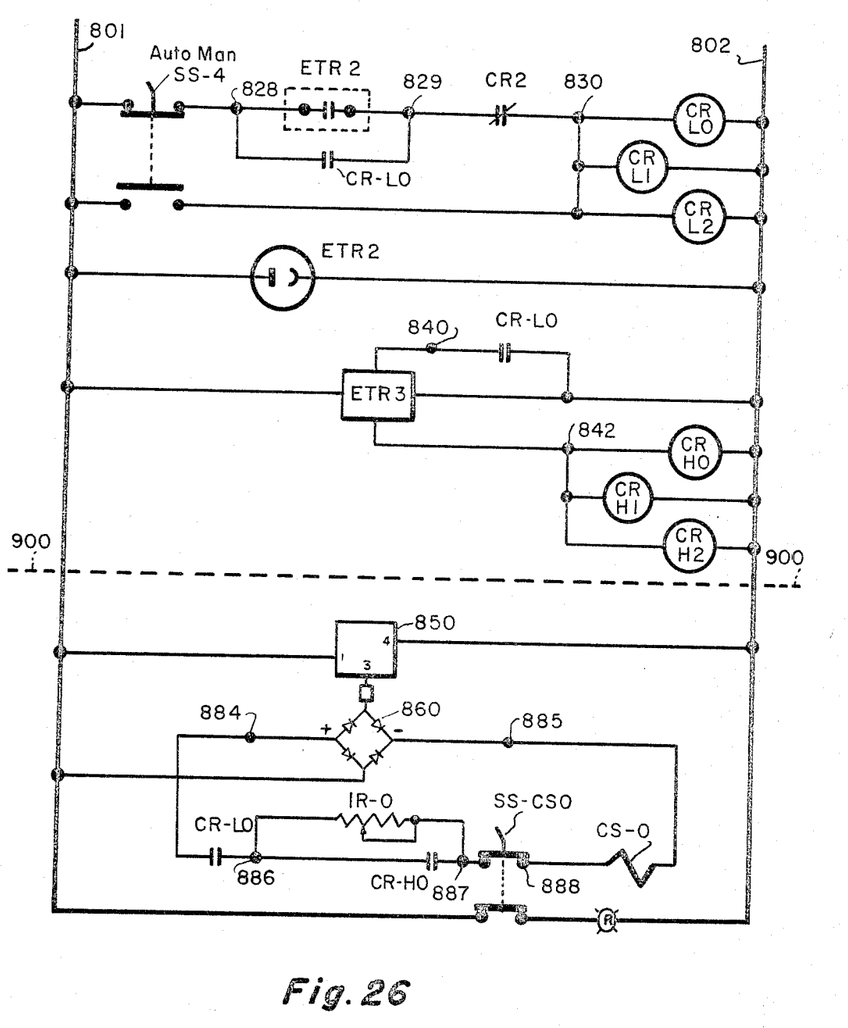
FIGURE 26 is an illustrative circuit diagram showing a control system for operating the embodiments of FIGURES 24 and 25.

The circuit diagram shown in FIGURE 26 embodies control means that have been found to control the impact of the cutting wheel on the glass surface. Such means consists of applying sufficient voltage to just cause the cutter to extend and then instantly applying full cutting voltage. The matter of time is extremely critical because the cutter extends in from about .008 to .010 second. In the diagram of FIGURE 26, 110 v. A.C. current is provided by the leads 801 and 802. Such leads may be a continuation of the circuit diagram of my aforementioned patent (entitled "Glass Cutting Machine"). In that diagram circuitry means are provided to drive a cutter bar or cutting bridge across the cutting table of an automatic glass cutting machine. In that apparatus, a contact (CR–2 (429–430) of FIGURE 15) is caused to close to cause the glass cutters mounted on the cutting bar to extend their cutting wheels into a glass scoring position. In the diagram of FIGURE 26, the contact CR–2 (829–830) may be regarded as such a contact, and consequently, (as shown in FIGURE 26) will be closed so that the cutter bar 726 of FIGURE 24 or cutter bar 26 of FIGURE 1 may be regarded as being driven across a glass sheet such as sheet 142 of FIGURE 8 or 742 of FIGURE 24. Positioned between lead 801 and a series of relay coils CR–L0, CR–L1 and CR–L2 (830–802) is a manually operated switch SS–4 (801–828) which in the present embodiment is shown to be closed for automatic operation of the glass cutters such as cutters 778, 780 and 782 of FIGURE 24. There is also positioned between the lead 801 and the aforementioned relays an open contact ETR-2 (828-829). ETR-2 is an adjustable time relay instrument that is caused to function in conjunction with photoelectric cell ETR-2 (801-802) which in the embodiment of FIGURE 25 would be photoelectric cell 764.

In the embodiment of my aforementioned patent entitled "Glass Cutting Machine," the relays CR-L0, CR-L1 and CR-L2 (830-802) are described as solenoids Y which lower the glass cutting wheels into scoring position. In the present embodiment, however, these members may be regarded as being relays disposed to energize other relays and adjust contacts in a manner to apply an initial low voltage to the solenoids of the glass cutters to just cause the cutter to extend and then instantly apply full cutting voltage. Such method will be described in fuller detail hereinbelow.

In the operation of a cutting machine such as that described in my patent entitled "Glass Cutting Machine," while employing glass cutters as in the present invention, I have found it to be expedient to space the glass cutters such as glass cutters 778, 780 and 782 of FIGURE 24 along the cutter bar 726 (or cutter bar 26 of FIGURE 1), so that each glass cutter may be regarded as having a "home position" of about eight inches apart. In this manner, a glass cutter is available at or near any desired scoring position when a glass sheet such as sheet 742 is indexed on the cutting table of the glass cutting machine. Thus, the first cutter (cutter 782 of FIGURE 24) may be regarded as being at position "0" (or the "home" position), and such cutter, for purposes of the present description, is provided with a circuit such as falls below the dotted line 900 of FIGURE 26.

The first cutter (such as cutter 782 of FIGURE 24) or the circuit falling below the dotted line 900 is effected or controlled by the relays CR-L0 (830-802) and CR-H0 (842-802). The second cutter spaced eight inches therefrom has a substantially identical circuitry, but is controlled by the relays CR-L1 (830-802) and CR-H1 (842-802) and the third cutter 778, spaced sixteen inches from cutter 782, will be controlled by the relays CR-L2 (830-802) and CR-H2 (842-802). It will be appreciated that numerous other glass cutters may be mounted to the bar 726 of FIGURE 24 and that each will be controlled by relays, such as CR-L0, CR-L1, CR-L2, CR-H0, CR-H1 and CR-H2 and, indeed, such relays may be readily included in the circuitry of FIGURE 26, each set of such relays controlling a separate system such as falls below the line 900 of FIGURE 26.

The solenoids best suited for the glass cutters of the present invention are the tapered plunger D.C. coil solenoids such as shown by the diagram of FIGURE 13. The circuit of FIGURE 26 as previously described is provided with 110 v. A.C. current. Accordingly, the current supply from leads 801 and 802 must be converted to D.C. power where applied to the individual solenoids as shown in the diagram of FIGURE 26. Such current is conducted through a powerstat or auto-transformer 850 with primary 1-4 and secondary 1-3 windings. The powerstat or auto-transformer 850 provides a means for controlling the voltage supplied to the solenoids of the glass cutters as represented by the coils CS-0 (888-885). Such current is then conducted through a rectifier such as shown at 860 which supplies appropriate full wave direct current to the leads 884 and 885.

It will also be appreciated that a sensing device such as photoelectric cell 764 will not be positioned on every glass cutter. Consequently, photoelectric cell ET-R2 (801-802) of the present embodiment is mounted to only one of the three glass cutters (glass cutter 782) in the embodiment of FIGURE 24.

It may be seen that energization of the photoelectric cell ET-R2 (801-802) of the circuit diagram of FIGURE 26 will cause contact ET-R2 (828-829) to close after the appropriate adjustable time delay in a manner to cause all three of the relays CR-L0, CR-L1 and CR-L2 to energize the bi-voltage system of all three of the solenoids such as the solenoids of the glass cutters 778, 780 and 782 of FIGURE 24.

When contact ET-R2 (828-829) closes and relay CR-L0 (830-802) is energized, contact CR-L0 (828-829) closes in a manner to lock all three of the relays CR-L0, CR-L1 and CR-L2 into the circuit. Energization of relay CR-L0 (830-802) causes a contact CR-L0 (884-886) to close and energize the solenoid of glass cutter 782 by energizing the coil represented in FIGURE 26 as CS-0 (888-885) through an impact control resistor IR-0 (886-887). The applied voltage is divided between the resistor IR-0 (886-887) and the solenoid coil CS-0 (888-885). Thus, the solenoid (782 of FIGURE 24) in this instance is receiving a lower voltage, and such lower voltage, of course, may be regulated by regulating the resistance offered by resistor coil IR-0 (886-887). As the relay coil CR-L0 (830-802) is energized, it causes a contact CR-L0 (840-802) to close. Closing of contact CR-L0 (840-802) energizes the relays CR-H0, CR-H1 and CR-H2 (842-802). When contact CR-L0 (840-802) is caused to close, an adjustable time delay component ET-R3 (801-840) delays the time period between the initial energization of the CR-L0, CR-L1 and CR-L2 (830-802) relays and the energization of the CR-H0, CR-H1 and CR-H2 (842-802) relays for a fraction of a second (.008 to .010). Energization of coil CR-H0 (842-802) causes the contact CR-H0 (886-887) to close so that direct current from lead 884 bypasses the impact control resistor IR-0 (886-887) to apply full cutting voltage to the coil CS-0 (888-885) and hence, effect full voltage to the solenoid of the glass cutter 782 of FIGURE 24.

Consequently, the sequence of events in extending the cutting wheel of glass cutter 782 when contact ETR-2 (828-829) closes is (a) relay coil CR-L0 (830-802) is energized; (b) contacts CR-L0 close to extend the plunger of the solenoid at low voltage and energize relay coil CR-H0 (842-802) through a time delay element; and (c) relay coil CR-H0 (842-802) closes a contact CR-H0 to apply full voltage to the solenoid (.008 to .010 sec.) after the low voltage was applied. Such time delay permits the cutting solenoid to extend the cutting wheel with less chance of impact damage than where full voltage is immediately applied.

It may be readily seen from the diagram of FIGURE 26 that the glass cutters 778 and 780 have been caused to extend under identical circumstances, inasmuch as the relay CR-L0 (830-802) causes the time delay contacts through relay coils CR-H1 and CR-H2 (842-802) to have a similar effect on coils such as CS-0 (888-885) to effect extension of the cutting elements of glass cutters 778 and 780.

Attention is called to FIGURE 1 wherein there is shown a light element 803 and a switch 805. Such switch may be identified from the diagram of FIGURE 26 as switch SS-CS0 (887-888 and 801-802). When switch SS-CS0 is closed, the light R (801-802) (light 803 of FIGURE 1) is on. Thus, it may be seen that if the switch corresponding to switch SS-CS0 of glass cutter 782 may be opened for any individual cutter and the solenoid coil such as solenoid coil CS-0 (888-885) will not be energized, and the light R (801-802) (light 803 in FIGURE 1) will not light up. The effect is that any one or more of the glass cutters 778, 780 and 782 may be de-activated and will merely travel across a glass sheet with their glass cutters retracted during the scoring cycle of the glass cutting machine.

In accordance with my aforementioned patent, entitled "Glass Cutting Machine," after the glass cutters have been propelled across the glass sheets, the contact CR2 (829-830) will open so as to de-energize the relays CR-L0, CR-L1 and CR-L2 (830-802). Hence, the contacts CR-L0 (884-886 and 840-802) will open to de-energize the solenoids of any or all of the glass cutters, 778, 780 and 782 so that the springs such as springs 120 of FIGURE 10, 276 of FIGURE 17 and 476 of FIGURE 19 will cause the respective pillar post holders, pillar post and glass cutting wheels to be retracted.

It will be appreciated that there may be many obvious modifications of the glass cutter of the present invention. The circuit and control diagram of FIGURE 26 is highly advantageous and preferred. However, it will be understood that the other control systems may be employed in conjunction with the glass cutters of FIGURES 1 through 23. It will also be appreciated, however, that the principles of the system described, particularly by the diagram of FIGURE 26, may be employed in conjunction with other solenoid operated glass cutters.

Other modifications of the apparatus of FIGURES 1 through 23 will be obvious. For example, a greater or lesser number of wheels such as wheels 136 of the embodiment of FIGURE 1 may be readily employed. Additionally, sensing means other than photoelectric cells obviously may be used.

The embodiments and descriptions of FIGURES 1 through 26 of the apparatus and method of the present invention are illustrative of my invention and the claims are not limited to the exact details set forth.

I claim:

1. A glass cutter for mounting to the cutter bar of a glass cutting machine comprising:
    (A) A frame;
    (B) Said frame being provided with mounting means for mounting said glass cutter to said cutter bar that includes means for positioning said cutter along said bar;
    (C) Glass cutting means mounted on said frame;
    (D) Means for extending said glass cutting means downwardly so as to bear on the surface of glass sheets indexed in said glass cutting machine so as to score said sheets when relative horizontal movement between said sheets and said cutter bar is effected by said glass cutting machine, said means including means for retracting said glass cutting means upwardly so as to disengage said sheets, and
    (E) Means for positioning said glass cutting means when extended, in a predetermined vertical position disposed to effect a predetermined depth of score before, after and during its contacting of said sheets.

2. A glass cutter according to claim 1 wherein said glass cutting means C consists of a vertically mounted elongated member having a glass cutting wheel mounted to its bottom and disposed to cut said glass when extended downwardly.

3. A glass cutter according to claim 2 wherein said means E for positioning said glass cutting wheel consists of a plurality of wheels horizontally rotatably mounted to said elongated member and vertically aligned to bear on and rotate on the surface of said glass sheets during said relative movement of said sheets in respect to said cutter bar, said wheels being disposed to contact a horizontal level spaced above the lowermost horizontal level reached by said cutting wheel.

4. A glass cutter according to claim 1 wherein said mounting means B consists of a plurality of wheels rotatably mounted to said frame and disposed to bear upon and rotate longitudinally upon the surface of said cutter bar so as to adjustably support said glass cutter on said cutter bar.

5. A glass cutter according to claim 4 wherein said mounting means includes a toothed rack attached longitudinally to said cutter bar and gear means mounted to said frame in meshing relationship to said toothed rack, and means for rotating said gear means so as to position said glass cutter on said cutter bar.

6. A glass cutter according to claim 5 wherein said means for rotating said gear means consists of a vertically positioned shaft extending above said frame having a horizontally positioned, vertically mounted gear wheel rigidly attached thereto, said gear wheel being disposed to engage in meshing relationship to a toothed driving means disposed to cause said gear wheel to rotate and effect rotation of said shaft so as to position said glass cutter along said cutter bar.

7. A glass cutter according to claim 6 wherein means are provided to lock said glass cutter to said cutter bar, said means consisting of a horizontally positioned brake shoe pivotally mounted to the top of said frame disposed to pivotally move in a horizontal plane so that the brake lining of said brake shoe may be brought into contact with said gear wheel, spring means disposed to urge said brake shoe into contact with said gear wheel so as to lock said glass cutter to said cutter bar, and an elongated cam rotatably mounted to said frame adjacent said brake shoe disposed to bear on and urge said brake shoe pivotally away from said gear wheel in opposition to said spring means so as to unlock said glass cutter from said cutter bar, when said elongated cam is rotated.

8. A glass cutter according to claim 6 wherein means are provided to lock said glass cutter to said cutter bar, said means consisting of a brake drum horizontally positioned and rigidly mounted to said vertically positioned shaft above said frame, a horizontally positioned brake shoe pivotally mounted to the top of said frame disposed to pivotally move in a horizontal plane so that the brake lining of said brake shoe may be brought into contact with said brake drum, spring means disposed to urge said brake shoe into contact with said brake drum so as to lock said glass cutter to said cutter bar and an elongated cam rotatably mounted to said frame adjacent said brake shoe disposed to bear on and urge said brake shoe pivotally away from said drum in opposition to said spring means, so as to unlock said glass cutter from said cutter bar, when said elongated cam is rotated from a position wherein its elongated dimension is substantially parallel to the adjacent surface of said brake shoe.

9. A glass cutter according to claim 7 wherein said cam is an eccentric cam disposed to urge said brake shoe away from said gear wheel when rotated.

10. A glass cutter according to claim 8 wherein said cam is an eccentric cam disposed to urge said brake shoe away from said drum when rotated.

11. A glass cutter for mounting to the cutter bar of a glass cutting machine comprising:
    (A) A frame;
    (B) Means for mounting said frame to said cutter bar;
    (C) Glass cutting means consisting of a downwardly depending elongated member mounted to said frame having a glass cutting wheel mounted to its bottom end;
    (D) Means for extending said elongated member C downwardly so that said wheel will bear on the surface of glass sheets indexed on the cutting table of said glass cutting machine and score said sheets when relative horizontal motion is effected between said cutter bar and said sheets by said glass cutting machine;
    (E) means for retracting said elongated member upwardly, and
    (F) Means for positioning said glass cutting wheel for a predetermined depth of score just before, during and just after said wheel contacts the surface of said glass sheets.

12. A glass cutter according to claim 11 wherein said means F consists of a carriage having a central bore through which said downwardly depending member extends, a plurality of wheels horizontally mounted to said carriage positioned about said elongated member disposed to rotate in parallel vertical planes in the direction of relative horizontal movement of said sheets in respect to said cutter bar, said wheel being disposed to bear on a plane that is spaced a predetermined distance above said glass cutting wheel.

13. A glass cutter according to claim 12 wherein said plurality of wheels consists of at least one wheel positioned forward of said cutting blade and at least one wheel positioned rearward of said cutting blade in accordance with the relative direction of travel of said glass cutter when scoring said glass sheets.

14. A glass cutter according to claim 13 wherein said cutter is provided with control means disposed to sense the edge of said glass sheets and cause said means D to extend said elongated member C downwardly so that said at least one wheel positioned forward of said cutting blade bears on said glass sheets before said cutting blade contacts the edges of said sheets and to sense the opposite edge of said sheets and retract said elongated member upwardly after said cutting blade no longer contacts said sheet, but while said at least one wheel positioned rearwardly of said cutting blade still contacts said glass sheets.

15. A glass cutter comprising:
   (A) A frame disposed to be mounted above glass sheet conveyor means;
   (B) A pillar post holder mounted on said frame disposed to receive a pillar post so that the cutter wheel of said pillar post depends from said frame;
   (C) Means for extending said pillar post holder downwardly so that upon predetermined relative motion of glass sheets positioned on said conveyor means and said glass cutter, said cutting wheel will be caused to bear on the surface and score said glass sheets;
   (D) Means for retracting said holder upwardly so that said cutting wheel may be suspended above said conveyor means and glass sheets positioned thereon;
   (E) A plurality of wheels rotatably, horizontally mounted about the bottom of said holder in substantially parallel vertical planes and being disposed to bear on a common horizontal plane;
   (F) Means for spacing the cutting wheel a predetermined distance below said horizontal plane, and
   (G) Guide means attached to said frame and disposed to guide and support said holder.

16. A glass cutter according to claim 15 wherein said guide means G consists of depending members rigidly attached to said frame, link members pivotally attached at one end to said depending members and pivotally and slideably engaged to said holder at the other end.

17. A glass cutter according to claim 15 wherein said guide means G consists of depending members rigidly attached to said frame and extending downwardly on opposing sides of said frame, said depending members being formed with vertically positioned elongated slots, guide members extending horizontally from said holder disposed to ride in said slots so as to guide and support said holder.

18. A glass cutter according to claim 15 wherein said guide means G consists of opposing parallel pairs of elongated members, rigidly attached at their upper ends to said frame and extending downwardly on either side of said holder, each said member being spaced from the other member of each said pair so as to define a guide space therebetween, guide members extending horizontally from said holder disposed to project between each said pair of elongated members so as to ride in said guide space.

19. A glass cutter for mounting to the cutter bar of a glass cutting machine comprising:
   (A) A glass cutting wheel rotatably mounted to a holder;
   (B) Mounting means for mounting said holder to said cutter bar so that said glass cutting wheel depends;
   (C) A solenoid supported on said mounting means and disposed to extend its plunger downwardly to bear upon said holder and thereby cause said holder to extend downwardly so that said cutting wheel may bear on the surface of glass sheets when relative motion between said sheets and said cutter bar is effected by said glass cutting machine to score said glass sheets;
   (D) Control means for controlling the force with which said solenoid extends its plunger, said control means including
      (1) means for providing a first voltage sufficiently high to cause said plunger to extend and
      (2) means for providing a second voltage higher than said first voltage to effect an increased downward force on said holder; and
   (E) Means for positioning said holder while extended so that said cutting blade is positioned at a predetermined scoring level prior to its contacting said glass sheets.

20. A glass cutter according to claim 19 wherein said first voltage is disposed to effect sufficient downward force to merely extend said holder and said second voltage is disposed to effect sufficient downward force to cause said cutter blade to score said glass sheets.

21. A glass cutter according to claim 19 wherein said control means includes a contact disposed to be closed and energize a relay, said relay being disposed to:
   (A) Cause a contact to close completing a circuit to said solenoid of sufficient voltage to cause said plunger to extend; and to
   (B) Cause a contact to close completing a circuit to a time delay means which after a predetermined time delay completes a circuit to a second relay, said second relay when energized being disposed to close a contact completing a circuit to said solenoid of greater voltage than that effected in "A" above, said voltage being sufficient to provide glass scoring force to said holder.

22. A glass cutter according to claim 21 wherein said control means includes means disposed to sense the presence of said glass sheets and to close said first mentioned contact to energize said relay when sheets are sensed.

23. In a glass cutting apparatus wherein the solenoids of solenoid operated glass cutters are electrically energized to extend their plungers to provide the force to extend glass cutting means into engagement with a glass surface, the improvement of control means comprising means for providing a first voltage to said solenoids sufficiently high to cause their plungers to extend said glass cutting means and means for providing a second voltage to said solenoid that is higher than said first voltage so as to effect an increased force on said glass cutting means.

24. In a glass cutting apparatus wherein the solenoids of solenoid operated glass cutters are electrically energized to extend their plungers to provide the force to extend glass cutting means into engagement with a glass surface, the improvement of control means consisting of a contact disposed to be closed and energize a relay, said relay being disposed to:
   (A) Cause a first contact to close completing a circuit to said solenoid of sufficient voltage to cause said plunger to extend; and
   (B) Cause a second contact to close completing a circuit to a time delay means which after a predetermined time delay completes a circuit to a second relay which, when energized closes a third contact completing a second circuit to said solenoid of greater voltage than that effected in "A" above, said second voltage being sufficient to provide glass scoring force to said glass cutting means.

25. A glass cutting apparatus according to claim 23 wherein said first voltage is disposed to effect sufficient force to merely extend said glass cutting means and said second voltage is disposed to effect sufficient force to cause said glass cutting means to score said glass surface.

26. In a glass cutting apparatus wherein solenoid operated glass cutters are mounted to a cutter bar, the solenoids of said glass cutters being disposed to extend their plungers when electrically energized to provide downward force to extend glass cutting means into cutting engagement with relatively moving glass sheets horizontally positioned beneath said cutter bar, the improvement of control means disposed to sense the presence of said relatively moving glass sheets and close a first contact disposed to complete a circuit to a plurality of first relays, one of which is associated with the circuit of each said solenoid operated glass cutters, each said first relays being disposed to close corresponding second contacts to complete a first circuit to each of the solenoids of said glass cutters, said first circuit being of a voltage to cause the plungers of said solenoids to extend the cutting means into a non-scoring engagement with said glass sheets, at least one of said first relays being disposed to complete a circuit to a time delay switch disposed to time out after a predetermined time to complete a circuit to a second plurality of relays, one of which is associated with the circuit of each said solenoid operated glass cutters, each said second relays being disposed to close corresponding second contacts to complete a second circuit to each of the solenoids of said glass cutters, said second circuit being of a voltage to cause the plungers of said solenoids to provide a score engaging force to said glass cutting means.

References Cited by the Examiner

UNITED STATES PATENTS

| | | | |
|---|---|---|---|
| 2,515,445 | 7/1950 | Gilstrays | 83—12 |
| 3,018,587 | 1/1962 | Insolio et al. | 83—12 |
| 3,081,659 | 3/1963 | Theobold | 83—554 |
| 3,107,834 | 10/1963 | Huffman | 83—6 X |
| 3,140,634 | 7/1964 | McDaniel | 83—554 |
| 3,216,635 | 11/1965 | Lefeuve | 83—12 X |

FOREIGN PATENTS

| | | |
|---|---|---|
| 1,215,209 | 4/1960 | France. |
| 577,001 | 5/1933 | Germany. |

WILLIAM S. LAWSON, *Primary Examiner.*